Figure 1:
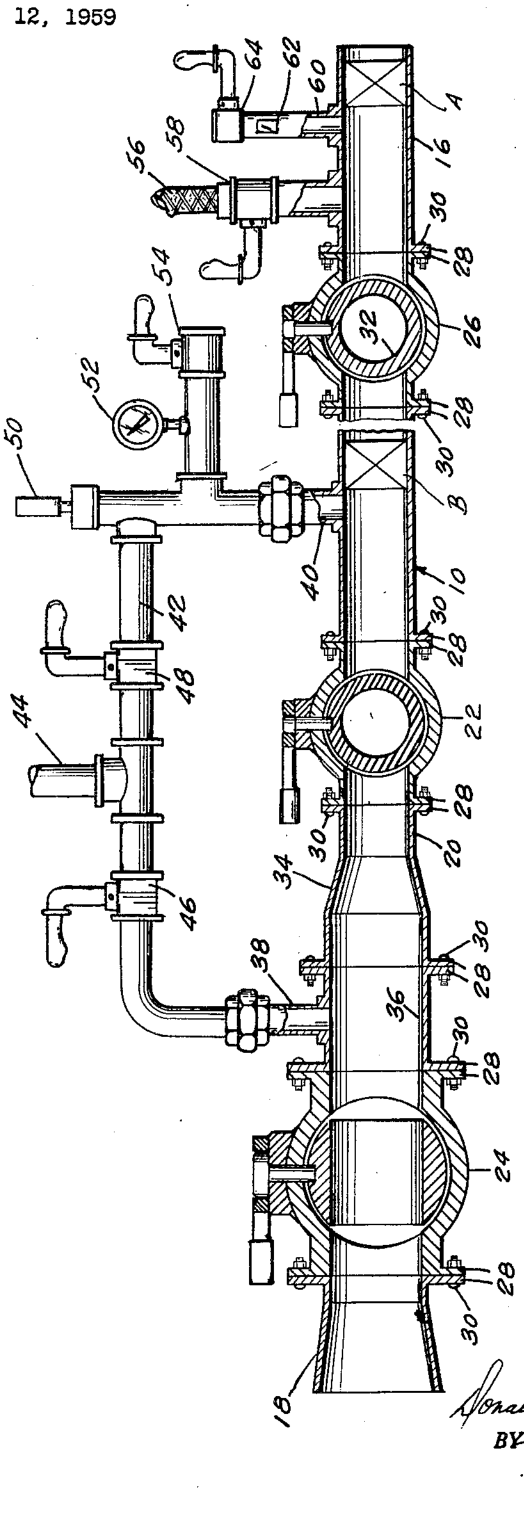

Dec. 11, 1962 D. P. COLLINS, JR 3,067,721

ACCESS JOINT ASSEMBLY

Filed Oct. 12, 1959 2 Sheets-Sheet 1

INVENTOR

Donald William Collins Jr.

BY Raymond W. Colton

ATTORNEY

INVENTOR.
Donald Pullin Collins Jr.
BY Raymond Wootton
ATTORNEY

Dec. 11, 1962    D. P. COLLINS, JR    3,067,721
ACCESS JOINT ASSEMBLY
Filed Oct. 12, 1959    2 Sheets-Sheet 2

INVENTOR.
Donald Pullian Collins Jr.
BY
Raymond Wootten
ATTORNEY

United States Patent Office 3,067,721 Patented Dec. 11, 1962

1

3,067,721
ACCESS JOINT ASSEMBLY

Donald Pulliam Collins, Jr., Garland, Tex., assignor to Harvest Queen Mill & Elevator Company, Dallas, Tex.

Filed Oct. 12, 1959, Ser. No. 845,932
12 Claims. (Cl. 118—408)

This invention relates to an improved assembly for use in cleaning, coating, and inspecting tubular members and, particularly, for introducing into fluid transmission pipeline, equipment necessary for the internal cleaning, coating and inspection of said lines in place.

The principal object of the instant invention is to provide an improved access joint assembly, the utilization of which will facilitate and enhance the application of a protective coating to the interior of a pipeline.

A second object is to provide an assembly for introducing means into a pipeline for treating said line to substantially increase through-flow thereof by reducing magnetic interference between the magnetic field induced into a pipeline (by the earth's magnetic field) and the field created by the atomic structure of hydrocarbons, or other paramagnetic minerals, contained in fluids being transported through the pipeline.

A further object of this invention is also to provide such an assembly which is capable of being employed with a minimum of disturbance to the line after the assembly has been installed and without any substantial interruption of the normal use of the pipeline.

Another object of the invention is to provide improved means for admitting cleaning and inspection apparatus into a pipeline and to control motion thereof within said pipe by providing a controlled environment therewith.

It is also an object of this invention to provide an assembly which allows introduction and removal of apparatus with respect to a pipeline without loss of internal pressure.

Still another object of the present invention is to provide a continuously controlled pressure which substantially reduces the danger to personnel and equipment that would otherwise occur with fluctuating pressures induced by presently existing devices during the operation described hereinafter.

In accordance with this invention, there is provided an assembly comprising a tubular body member for use in coating the interiors of pipelines by the use of controlled air to propel sequentially introduced resilient or self-adjusting coating and cleaning members therethrough, and constitutes an improvement over the apparatus disclosed in the U.S. Patent to Curtis et al., No. 2,480,358, dated August 30, 1949. The body member is provided with means for receiving pipeline cleaning and coating apparatus and supports means for intrducing pressurized air into such pipelines. The body member provides: for controlling the amount of air passing into and out of the body of the joint; means for controlling the passage of air from one section to another within the body member; means for injecting pipeline coating compound into an assembly tubular body; and air bleed means to evacuate air from the portion of said tubular body receiving the coating compound. The combination of elements constituting the present invention is readily applied to and removed from existing pipelines and facilitates the completion of the various operations to be performed with a minimum of assembly and disassembly of components.

Various other objects of the present invention will become evident from a more detailed description of the invention, the preferred embodiment of which is illustrated in the accompanying drawings wherein:

FIG. 1 is an elevation, partly in section of an assembly incorporating the present invention; and

2

Figure 2:
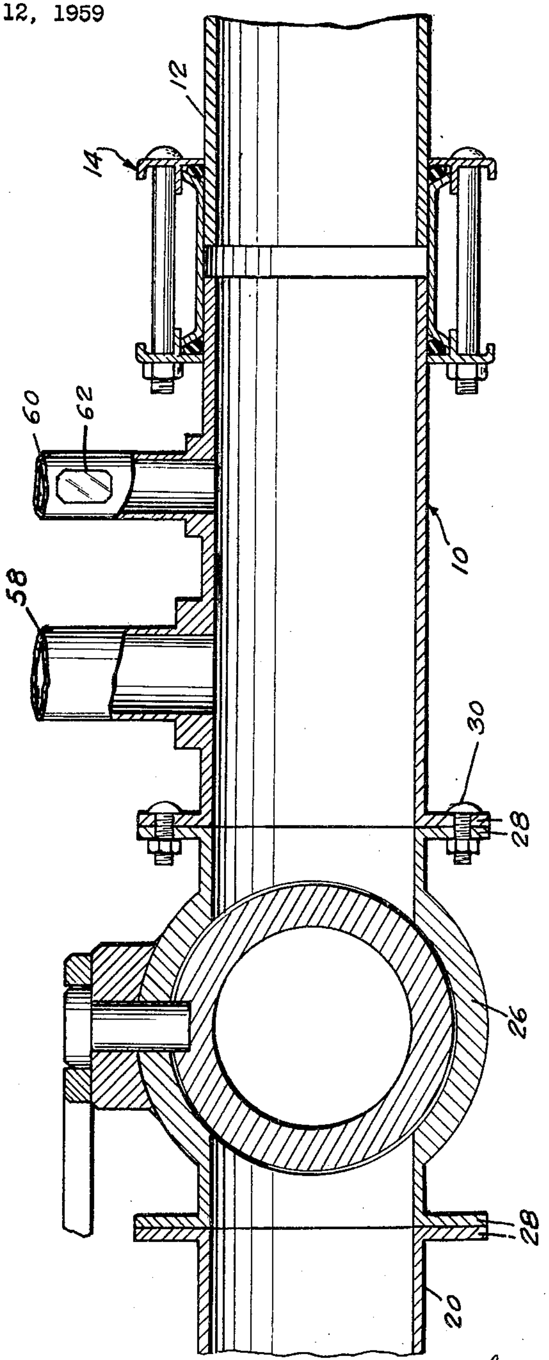

FIG. 2 is an enlarged sectional elevation showing the downstream end portion of the joint of the present invention coupled to a pipeline.

An access joint assembly 10 in accordance with the present invention has been depicted in FIG. 1. It is intended for application to an existing pipeline 12 as shown in FIG. 2, to which it is joined by a Dresser coupling 14 or the like.

The access joint assembly comprises a first tubular body 16 adapted to be coupled to the pipeline and a second tubular body 18 adapted to receive material for introduction to the pipeline. The tubular bodies 16 and 18 are interconnected by a tubular member 20 coaxial therewith, an intermediate portion of the tubular member containing a stop valve 22, a stop valve 24 being interposed between the tubular member 20 and the second tubular body 18 and a stop valve 26 being interposed between the tubular member 20 and the tubular body 16. The tubular bodies, the tubular member and the stop valves are depicted as having flanges 28 secured together by bolts 30 for maintaining fluid tight conditions.

Regarding the first tubular body 16 as constituting the downstream end of the assembly shown in FIG. 1, the portion of the tubular member proximate thereto contains a passage whose cross section is equal to that of the tubular body 16 and the interposed stop valve 26 also contains a passage 32 of the same cross section. The passage provided by the valve 22 intermediate the tubular member also has a cross section corresponding to that of the tubular body 16. Upstream from the valve 22, the tubular member is provided with a divergent section 34 communicating with an enlarged passage 36 having a cross section corresponding with that of the valve 24. The second tubular body 18 has its end diverging in an upstream direction to facilitate the introduction of plugs and such other equipment as may be required for treatment of the pipeline 12.

Intermediate the pair of stop valves 22 and 24, a compressed air supply line 38 communicates with the upstream portion of the tubular member 20. Similarly, intermediate the pair of stop valves 22 and 26, a compressed air supply line 40 communicates with the downstream portion of the tubular member 20. These fluid pressure supply lines 38 and 40 are joined together by a manifold 42 having a common compressed air supply conduit 44 which may supply compressed air to either the upstream portion or the downstream portion of the tubular member 20 by manipulation of valves 46 and 48 controlling the upstream and downstream portions respectively. The manifold 42, adjacent the downstream portion of the tubular member 20 contains a fluid pressure regulator 50, a pressure gage 52 and a bleed valve 54.

Communicating with the first tubular body 16 there is a coating material supply line 56 containing a valve 58 through which the introduction of coating material is controlled. Also in communication with the first tubular body 16 there is a bleed line 60 containing an observation window 62 and a bleed valve 64.

Assuming the valve 24 to be open and the valves 22 and 26 to be closed as depicted in FIG. 1, a plug A of the type disclosed in the Curtis et al. patent No. 2,480,358, already referred to, can be introduced through the flaring inlet opening of the second body member 18 through the valve 24 and into the upstream portion of the tubular member 20 beyond the junction with the compressed air supply line 38. The valve 24 can then be closed, and upon opening the valve 46, the plug can be urged in a downstream direction to the valve 22. Upon opening the valve 22, the plug can be urged farther in a downstream direction to the valve 32, whereupon the valve 22 can be closed and the valve 46 can be closed. Then the valve 26 can be opened so that upon opening the valve 48, the air pressure will move the plug to a desired degree in a downstream direction into the pipeline to be treated. Then the coating material can be introduced between the plug and the closed valve 26 by opening the valve 58 and at the same time opening the valve 64 to bleed trapped air from the portion of the pipeline and the joint assembly which are to be filled with the coating material. By observing the rise of the coating material to the observation window 62 in the bleed line 60, the operator will know when to close the valves 58 and 64. At this point, a second plug B member can be introduced into the open end of the access joint through the now open valve 24 to a point beyond the junction of the compressed supply line 38, whereupon, the valve 24 will be closed and the valve 22 opened until the second plug reaches the closed valve 26. Then the valve 22 will be closed and the valve 26 opened and compressed air will be introduced behind the second plug through the supply line 40 to drive the coating material trapped between the first and second plugs in a downstream direction through the pipeline. These operations can be repeated for any desired number of plugs and charges of coating material until the entire pipeline has been coated.

It will be understood by those skilled in the art that an access joint assembly of the type depicted in FIG. 1 can be provided at each end of the pipeline to be coated so that suitable differential pressures can be imposed upon the plugs and the trapped charges of coating material between them to regulate the rate of travel of the coating composition and plugs as well as the direction of such travel. In this way, the plugs can be returned to the ends at which they were inserted and there removed, or they can be removed at a station remote from that at which they were inserted. It will be clear also that the bleed valve 54 permits the removal of any air or even liquid that may become trapped in the tubular member 20. The pressure regulator 50 can be set to provide a safe and desired pressure differential within the equipment and the value of such pressure can be observed on the gage 52.

It will be evident that the air pressure supply lines 38 and 40 can be employed to drive plugs or other material in either direction as desired and where a large volume of air is required for any particular operation, both of these supply lines can be used simultaneously. As a matter of fact, when the valve 22 is closed, the supply line 38 can be used to drive a plug downstream while the supply line 40 can be used to drive another plug downstream. Where the valve 22 is open, the two supply lines 38 and 40 can serve jointly to introduce air under pressure into the assembly.

The highly versatile characteristics of the access joint assembly constituting the subject matter of the present invention will become evident to those skilled in the art in the light of the foregoing description of the preferred embodiment depicted in the drawings. It will also be evident to those skilled in the art that the invention should not be restricted to this one preferred embodiment beyond the scope of the appended claims.

I claim:

1. An access joint assembly for pipelines comprising a first tubular body adapted to be coupled to a pipeline, a second tubular body adapted to receive material for introduction to said pipeline, a tubular member coaxial with and interconnecting said bodies, stop valves disposed intermediate said member and between said member and each of said bodies, an air pressure supply line connected with said member at at least two points one located on each side of the stop valve disposed intermediate said member, valve means in said supply line for controlling communication with said member, and a coating supply line connected to said first body.

2. An access joint assembly as set forth in claim 1 wherein a valved bleed port is connected to said first body.

3. An access joint assembly as set forth in claim 1 wherein said coating supply line contains a valve.

4. An access joint assembly as set forth in claim 1 wherein each of said stop valves contains a passage at least as large as that of said first body.

5. An access joint assembly as set forth in claim 1 wherein said stop valve proximate to said second body contains a passage lagrer than that of said first body.

6. An access joint assembly as set forth in claim 1 wherein said second body contains an outwardly flared passage.

7. An access joint assembly as set forth in claim 1 wherein said air pressure supply line contains a pressure regulator.

8. An access joint assembly as set forth in claim 1 wherein said air pressure supply line contains a bleed valve.

9. An access joint assembly as set forth in claim 1 wherein a bleed line containing a light transmitting section is connected to said first body.

10. An access joint assembly as set forth in claim 1 wherein said air pressure supply line contains a pressure gage.

11. An access joint assembly as set forth in claim 1 wherein said second body and a portion of said member have larger internal cross sections than said first body.

12. An access joint assembly as set forthin claim 1 wherein said first body and the portion of said member proximate thereto have substantially equal internal cross sections.

References Cited in the file of this patent

UNITED STATES PATENTS

| | | |
|---|---|---|
| 938,489 | James | Nov. 2, 1909 |
| 1,797,580 | Hopkinson et al. | Mar. 24, 1931 |
| 2,445,645 | Stephens | July 20, 1948 |
| 2,480,358 | Curtis et al. | Aug. 30, 1949 |
| 2,589,170 | Ver Nooy | Mar. 11, 1952 |
| 2,623,226 | Jones et al. | Dec. 30, 1952 |
| 2,815,078 | Reynolds | Dec. 3, 1957 |
| 2,915,422 | Stone | Dec. 1, 1959 |